United States Patent
Kurumisawa

(10) Patent No.: US 7,663,673 B2
(45) Date of Patent: Feb. 16, 2010

(54) IMAGE PROCESSING APPARATUS AND METHOD, AND IMAGE PROCESSING PROGRAM

(75) Inventor: Takashi Kurumisawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 680 days.

(21) Appl. No.: 11/145,222

(22) Filed: Jun. 6, 2005

(65) Prior Publication Data

US 2005/0270382 A1    Dec. 8, 2005

(30) Foreign Application Priority Data

Jun. 7, 2004  (JP)  ............................. 2004-168884

(51) Int. Cl.
 H04N 5/76  (2006.01)
 H04N 5/228  (2006.01)
(52) U.S. Cl. .................. 348/231.6; 348/222.1; 382/254
(58) Field of Classification Search ............. 348/222.1, 348/223.1, 252, 254–256, 423.1, 558, 599, 348/674, 231.6; 345/418; 382/107, 165, 382/276, 254; 358/519; 386/95, 98; 379/106.01; 347/15

See application file for complete search history.

(56) References Cited

U.S. PATENT DOCUMENTS

| | | | | |
|---|---|---|---|---|
| 5,629,988 | A * | 5/1997 | Burt et al. ................... | 382/276 |
| 6,151,078 | A * | 11/2000 | Yoneda et al. .............. | 348/558 |
| 6,462,786 | B1 * | 10/2002 | Glen et al. .................. | 348/599 |
| 6,719,392 | B2 * | 4/2004 | Qiao .......................... | 347/15 |
| 6,819,792 | B1 * | 11/2004 | Balasubramanian ........ | 382/165 |
| 6,940,957 | B2 * | 9/2005 | Elberbaum ............. | 379/106.01 |
| 7,133,070 | B2 * | 11/2006 | Wheeler et al. .......... | 348/223.1 |
| 2002/0030833 | A1 * | 3/2002 | Kuwata et al. .............. | 358/1.9 |
| 2002/0048389 | A1 * | 4/2002 | Komaki ...................... | 382/107 |
| 2002/0075336 | A1 * | 6/2002 | Uchioke et al. ................ | 347/3 |
| 2002/0122194 | A1 | 9/2002 | Kuwata et al. | |
| 2002/0135687 | A1 | 9/2002 | Nakajima et al. | |
| 2002/0140693 | A1 * | 10/2002 | Nakami et al. .............. | 345/418 |
| 2002/0140952 | A1 | 10/2002 | Fukasawa | |
| 2004/0066533 | A1 | 4/2004 | Nakajima | |
| 2004/0075754 | A1 * | 4/2004 | Nakajima et al. ........ | 348/231.6 |
| 2006/0013478 | A1 | 1/2006 | Ito et al. | |

FOREIGN PATENT DOCUMENTS

CN    1366421 A    8/2002

(Continued)

Primary Examiner—Lin Ye
Assistant Examiner—Dennis Hogue
(74) Attorney, Agent, or Firm—Lowe Hauptman Ham & Berner

(57) ABSTRACT

An image processing apparatus performs image processing on moving picture data by using image processing control information which defines image processing conditions and outputs the moving picture data subjected to the image processing to an image output device connected to the image processing apparatus. The image processing apparatus includes the following elements. A moving-picture-data obtaining unit obtains the moving picture data in units of blocks, each block including a plurality of unit images. An image-processing-control-information obtaining unit obtains image processing control information associated with each block of the moving picture data. An image processor performs image processing on each block of the moving picture data by using the image processing control information. An output unit outputs the moving picture data subjected to the image processing to the image output device.

12 Claims, 14 Drawing Sheets

FOREIGN PATENT DOCUMENTS

| | | |
|---|---|---|
| JP | 10-108086 | 4/1998 |
| JP | 2002-77723 | 3/2002 |
| JP | 2003-052002 | 2/2003 |
| JP | 2003-60935 | 2/2003 |
| KR | 10-0346621 | 7/2002 |

* cited by examiner

FIG. 7

| PHOTOGRAPHING INFORMATION SI |
|---|
| SHUTTER SPEED |
| EXPOSURE MODE |
| ISO |
| DIAPHRAGM STOP |
| PHOTOGRAPHING SCENE |
| STROBE ON/OFF |

IMAGE PROCESSING APPARATUS AND METHOD, AND IMAGE PROCESSING PROGRAM

RELATED APPLICATIONS

The present application is based on, and claims priority from, Japanese Application Number 2004-168884, filed Jun. 7, 2004, the disclosure of which is hereby incorporated by reference herein in its entirety.

BACKGROUND OF THE INVENTION

1. Technical Field

The present invention relates to a technique for performing image processing on moving picture data by using image processing information associated with the moving picture data.

2. Related Art

A technique for associating image processing control information concerning image processing conditions for image data with the image data is known, as disclosed in, for example, Japanese Unexamined Patent Application Publication No. 2003-52002. The image processing control information is determined depending on a combination of an image generating device, such as a digital still camera, and an output device, such as a printer, so that the quality of images output from the output device can be improved. Accordingly, in an image processing apparatus, image processing (image quality adjustment) on image data is executed according to the image processing control information (image processing conditions) associated with the image data, thereby obtaining an output image reflecting the image output characteristics of the output device.

In the above-described known technique, however, the image processing control information is set based on the image output characteristics of the specific image output device. Accordingly, if an image output device exhibiting image output characteristics different from those of the specific image output device is used, the quality of the output image cannot always be improved, and also, the quality of the two image output devices is not always consistent.

SUMMARY

There is a demand for not noly still images, but also moving pictures (also known as "movies" and "motion picutres"), that the image quality be adjusted and enhanced according to image processing control information associated with the image data. The standards for still images, such as JPEG, allow a space for filling in information required for image processing. In contrast, according to the compression processing standards for moving pictures, such as MPEG2, MPEG4, or Nancy, there is no space to insert information required for image processing.

An advantage of the invention is that it provides an image processing apparatus that can improve the quality of moving picture data by performing image processing based on image processing control information associated with the moving picture data.

According to an aspect of the invention, there is provided an image processing apparatus that performs image processing on moving picture data by using image processing control information which defines image processing conditions and that outputs the moving picture data subjected to the image processing to an image output device connected to the image processing apparatus. The image processing apparatus includes the following elements. A moving-picture-data obtaining unit obtains the moving picture data in units of blocks, each block including a plurality of unit images. An image-processing-control-information obtaining unit obtains image processing control information associated with each block of the moving picture data. An image processor performs image processing on each block of the moving picture data by using the image processing control information. An output unit outputs the moving picture data subjected to the image processing to the image output device.

The above-described image processing apparatus is disposed on, for example, a portable device or a display device, and performs image processing on moving picture data obtained from an external source based on image processing control information associated with the moving picture data, and outputs the processed moving picture data. The image processing apparatus obtains the moving picture data in units of blocks, each block including a plurality of unit images, and also obtains image processing control information associated with each block of the moving picture data. The image processing apparatus then performs image processing on each block of the moving picture data and outputs the moving picture data subjected to the image processing to the image output device.

According to another aspect of the invention, there is provided an image processing method for performing image processing on moving picture data by using image processing control information which defines image processing conditions and for outputting the moving picture data subjected to the image processing to an image output device. The image processing method includes: obtaining the moving picture data in units of blocks, each block including a plurality of unit images; obtaining image processing control information associated with each block of the moving picture data; performing image processing on each block of the moving picture data by using the image processing control information; and outputting the moving picture data subjected to the image processing to the image output device.

According to another aspect of the invention, there is provided an image processing program executed by a computer to perform image processing on moving picture data by using image processing control information which defines image processing conditions and to output the moving picture data subjected to the image processing to an image output device. The image processing program allows the computer to function as the following elements. Moving-picture-data obtaining means obtains the moving picture data in units of blocks, each block including a plurality of unit images. Image-processing-control-information obtaining means obtains image processing control information associated with each block of the moving picture data. Image processing means performs image processing on each block of the moving picture data by using the image processing control information. Output means outputs the moving picture data subjected to the image processing to the image output device.

According to the above-described image processing apparatus, image processing method, and image processing program, image processing can be performed on the moving picture data according to the preset image processing conditions, thereby making it possible to output high-quality moving picture data.

According to still another aspect of the invention, there is provided an image processing apparatus that performs image processing on moving picture data by using image processing control information which defines image processing conditions and that outputs the moving picture data subjected to the image processing to an image output device connected to the image processing apparatus. The image processing apparatus includes the following elements. A receiver receives digital broadcasting waves from a broadcasting station to generate broadcasting data. A moving-picture-data obtaining unit obtains the moving picture data in units of blocks from the broadcasting data, each block including a plurality of unit images. A program-table-data obtaining unit obtains program table data from the broadcasting data. An image-processing-control-information obtaining unit obtains image processing control information associated with each block of the moving picture data based on the program table data. An image processor performs image processing on each block of the moving picture data by using the image processing control information. An output unit outputs the moving picture data subjected to the image processing to the image output device.

The above-described image processing apparatus is disposed in, for example, a television receiving system, and performs image processing on moving picture data obtained from television broadcasting waves transmitted from a broadcasting station based on image processing control information associated with the moving picture data, and outputs the processed moving picture data. The image processing apparatus receives broadcasting waves from a broadcasting station to generate broadcasting data, and obtains moving picture data in units of blocks from the broadcasting data, each block including a plurality of unit images. The image processing apparatus also obtains program table data from the broadcasting data and obtains image processing control information associated with each block of the moving picture data from the program table data. The image processing apparatus then performs image processing on each block of the moving picture data by using the image processing control information, and outputs the processed moving picture data to the image output device.

According to another aspect of the invention, there is provided an image processing method for performing image processing on moving picture data by using image processing control information which defines image processing conditions and for outputting the moving picture data subjected to the image processing to an image output device. The image processing method includes: receiving digital broadcasting waves from a broadcasting station to generate broadcasting data; obtaining the moving picture data in units of blocks from the broadcasting data, each block including a plurality of unit images; obtaining program table data from the broadcasting data; obtaining image processing control information associated with each block of the moving picture data based on the program table data; performing image processing on each block of the moving picture data by using the image processing control information; and outputting the moving picture data subjected to the image processing to the image output device.

According to another aspect of the invention, there is provided an image processing program executed by a computer to perform image processing on moving picture data by using image processing control information which defines image processing conditions and to output the moving picture data subjected to the image processing to an image output device. The image processing program allowing the computer to function as the following elements. Receiving means receives digital broadcasting waves from a broadcasting station to generate broadcasting data. Moving-picture-data obtaining means obtains the moving picture data in units of blocks from the broadcasting data, each block including a plurality of unit images. Program-table-data obtaining means obtains program table data from the broadcasting data. Image-processing-control-information obtaining means obtains image processing control information associated with each block of the moving picture data based on the program table data. Image processing means performs image processing on each block of the moving picture data by using the image processing control information. Output means outputs the moving picture data subjected to the image processing to the image output device.

According to the above-described image processing apparatus, image processing method, and image processing program, image processing can be performed on the moving picture data according to the preset image processing conditions, thereby making it possible to output high-quality moving picture data.

It is preferable that the above-described image processing apparatus includes: an adjusting-information obtaining unit that obtains, according to the image output device, adjusting information for adjusting the image processing control information in accordance with image output characteristics of the image output device; and an adjusting unit that adjusts the obtained image processing control information by using the obtained adjusting information. The image processor may perform the image processing by using the adjusted image processing control information.

With this arrangement, the image processing control information can be adjusted in accordance with the image output characteristics of the image output device. Accordingly, high-quality moving picture data suitable for the image output characteristics of the image output device can be obtained.

In the image processing apparatus, it is preferable that the unit image is a frame image and the block includes a plurality of frame images corresponding to one scene.

BRIEF DESCRIPTION OF THE DRAWINGS

The invention will be described with reference to the accompanying drawings, wherein like numbers reference like elements, and wherein:

FIG. 7 illustrates examples of parameters recorded as the photographing information SI;

DESCRIPTION OF THE EMBODIMENTS

An image processing apparatus and method and a display device and method are described in detail below with reference to the accompanying drawings through illustration of embodiments of the invention.

First Embodiment

Figure 1:
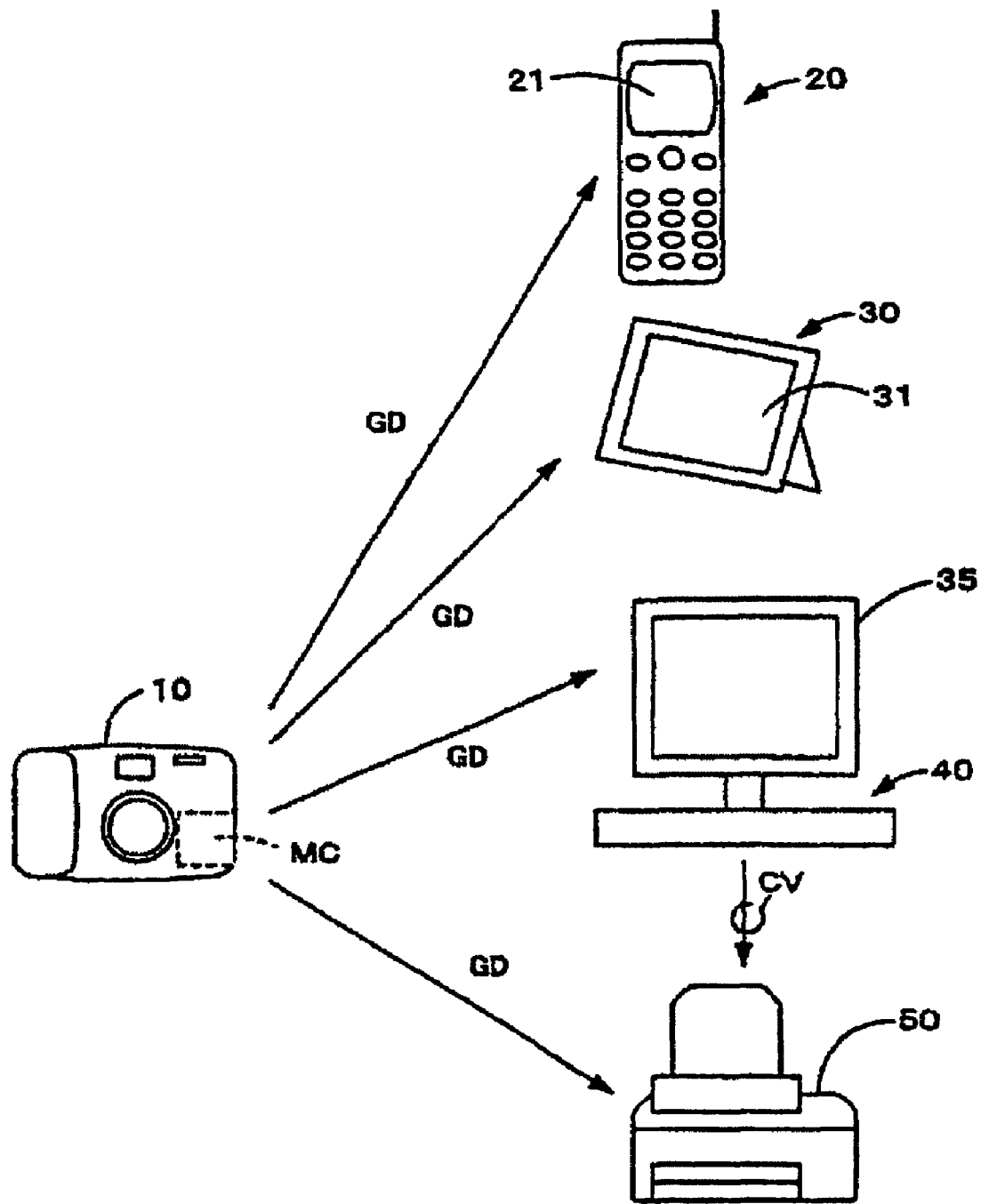
FIG. 1 is a schematic diagram illustrating an image processing system according to a first embodiment of the invention.
Figure 2:
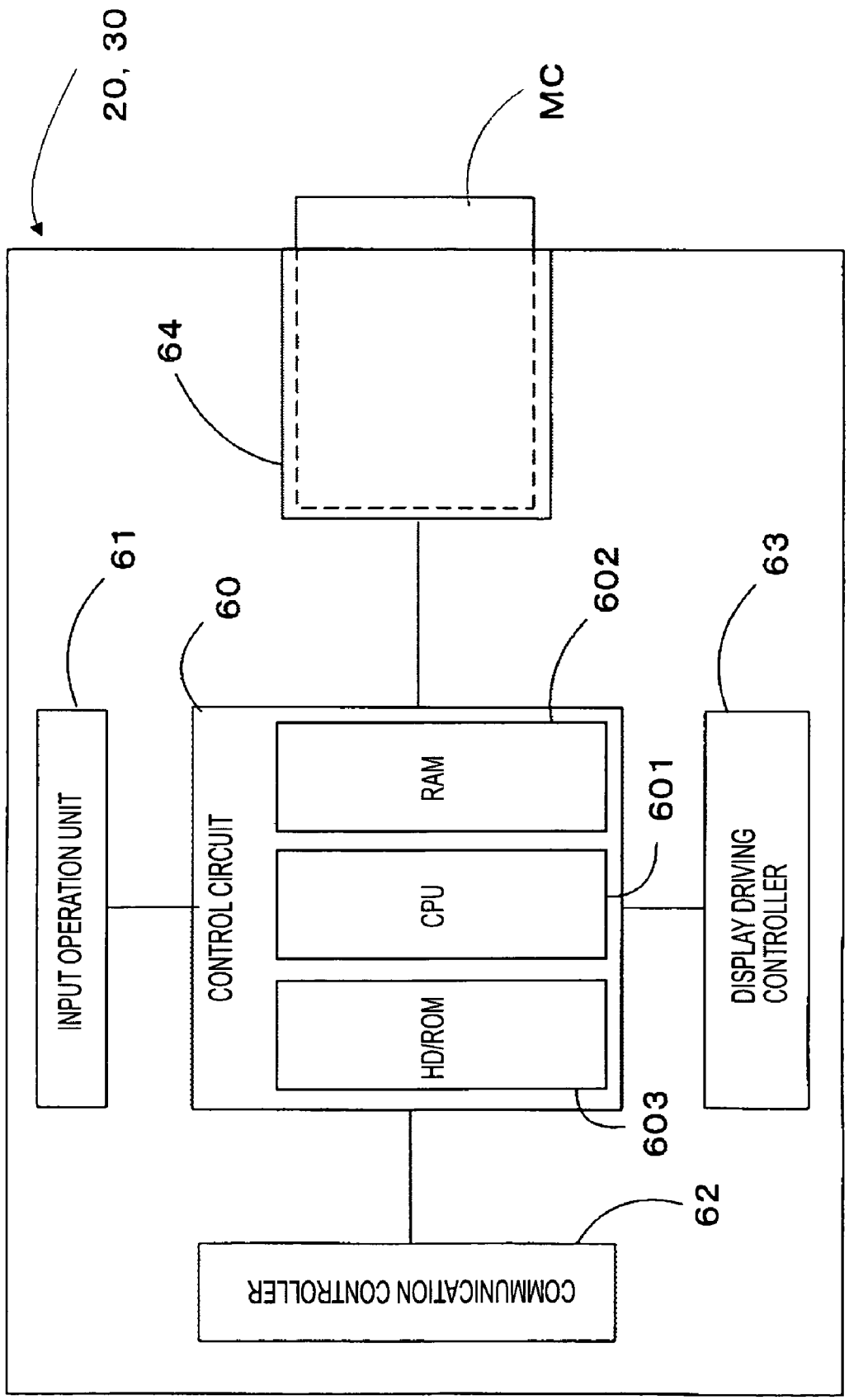
FIG. 2 is a block diagram illustrating the schematic configuration of an image processing apparatus according to the first embodiment of the invention.

A description is now given, with reference to FIGS. 1 and 2, of an image processing system including an image processing apparatus (display device) according to a first embodiment of the invention.

The image processing system shown in FIG. 1 includes a digital camera 10, which serves as an input device for generating moving picture data, a portable device 20, a display device 30, a personal computer 40, and a color printer 50. The portable device 20, which serves as an image processing apparatus, performs image processing on moving picture data GD by using image processing control information GI related to the moving picture data GD, and also serves as a display image output device (display device) for outputting moving pictures by using the moving picture data subjected to the image processing. The personal computer 40, which serves as an image processing apparatus, performs image processing on the moving picture data GD by using the image processing control information GI in accordance with an image output device connected to the personal computer 40. A color printer 50, which serves as a printed-image display output device, outputs still images by using the moving picture data subjected to the image processing.

The digital camera 10 forms an image on a digital device (photoelectric conversion element, such as a charge-coupled device (CCD) or a photomultiplier) by converting optical information into electrical information. The digital camera 10 includes a photoelectric conversion circuit provided with a CCD for converting optical information into electrical information, an image generating circuit for generating images by controlling the photoelectric conversion circuit, and an image processing circuit for processing generated digital images.

The digital camera 10 can generate, not only still images, but also moving picture data for a comparatively short time (generally referred to as "movie") according to the standards, such as MPEG. The digital camera 10 stores the generated moving pictures in a storage unit, such as a memory card MC, as digital data.

When generating the moving picture data GD, the digital camera 10 sets photographing information SI concerning photographing conditions which are set during a photographing operation and the image processing control information GI defining image processing conditions stored in a memory, such as a read only memory (ROM), of the digital camera 10. Since the standards, such as MPEG, do not allow the photographing information SI and the image processing control information GI to be stored in the moving picture data GD, they are handled as data different from the moving picture data GD. That is, the moving picture data GD, the photographing information SI, the image processing control information GI are stored in the memory card MC as separate data.

The portable device 20, which is a portable terminal including a relatively small display unit 21, may be a cellular telephone or a personal digital assistant (PDA). The portable device 20 obtains image data from the digital camera 10 or a network server (not shown) via a storage medium, wireless communication, such as infrared communication or radio communication, or a cable. The display unit 21 may be a liquid crystal display or an organic electroluminescence (EL) display, and exhibits image output characteristics unique to the display panel of the display unit 21.

The display device 30, which is an image display device provided with a display unit 31, executes image processing on moving picture data as a stand-alone device to display output images. The display device 30 obtains image data from the digital camera 10 or a network server (not shown) via a storage medium, wireless communication, such as infrared communication or radio communication, or a cable. The display unit 31 may be a liquid crystal display or an organic EL display, and exhibits image output characteristics unique to the display panel of the display unit 31.

The portable device 20 or the display device 30 has an internal circuit configuration, such as that shown in FIG. 2. The portable device 20 or the display device 30 includes a control circuit 60, an input operation unit 61, a communication controller 62, a display driving controller 63, and a memory card slot 64.

The control circuit 60 includes a central processing unit (CPU) 601 for executing various types of computation processing, such as image processing, a random access memory (RAM) 602 for temporarily storing various data, such as input image data and computation results, and a hard disk (HD)/ROM 603 storing programs executed by the CPU 601 and an adjusting table for adjusting the image processing control information GI.

The input operation unit 61 is an interface for receiving an input operation from an external source. For the portable device 20, the input operation unit 61 may be a key operation unit or a scroll operation unit. For the display device 30, the input operation unit 61 may be a touch panel operation unit.

The communication controller 62 controls communication for sending and receiving image data to and from the digital camera 10 or a network server, and performs, for example, communication in response to a request input via the input operation unit 61 and the control circuit 60. If the portable device 20 is a cellular telephone, audio communication can also be implemented by the communication controller 62.

The display driving controller 63 controls the drawing of output images to be displayed on the display units 21 and 31. For example, if the display units 21 and 31 are liquid crystal displays, the display driving controller 63 controls the driving of the orientation of the liquid crystals based on output image data sent from the control circuit 60 so as to form dot patterns corresponding to the output image data. If the display units 21 and 31 are cathode ray tube (CRT) displays, the display driving controller 63 drives a deflection yoke for deflecting electron beams emitted from electron guns so as to form an output image corresponding to output image data on a fluorescent material.

The memory card slot 64 is an installing portion for installing various memory cards, and image data recorded on a memory card installed in the memory card slot 64 is read by the control circuit 60.

The personal computer 40 is a general-purpose computer including a CPU, a RAM, and a hard disk, and executes image processing and computation processing similar to those performed by the control circuit 60. The personal computer 40 also includes a memory card slot for installing a memory card MC and an input/output terminal for connecting a connecting cable from, for example, the digital camera 10.

A display device 35 and the color printer 50, which serve as image output devices, are connected to the personal computer 40. If the personal computer 40 serves as an image processing apparatus, it performs image processing in accordance with the image output characteristics of the display device 35 and the color printer 50 by using the image processing control information GI.

The color printer 50 is a printer that can output color images, and may be an ink-jet printer for generating images by forming dot patterns by ejecting, for example, four colors of inks, such as cyan (C), magenta (M), yellow (Y), and black (K), onto a printing material. Alternatively, the color printer 50 may be an electro-photographing printer for forming images by transferring and fixing color toners on a printing material. In addition to the above-described four colors, the color inks may include light cyan (LC), light magenta (LM), blue, and red. The color printer 50 prints still images of specific frames of moving picture data generated by the digital camera 10. In this case, the digital camera 10 or the color printer 50 has a selection function of selecting images to be printed, and the user can select and determine desired images by operating the selection function.

Figure 5:
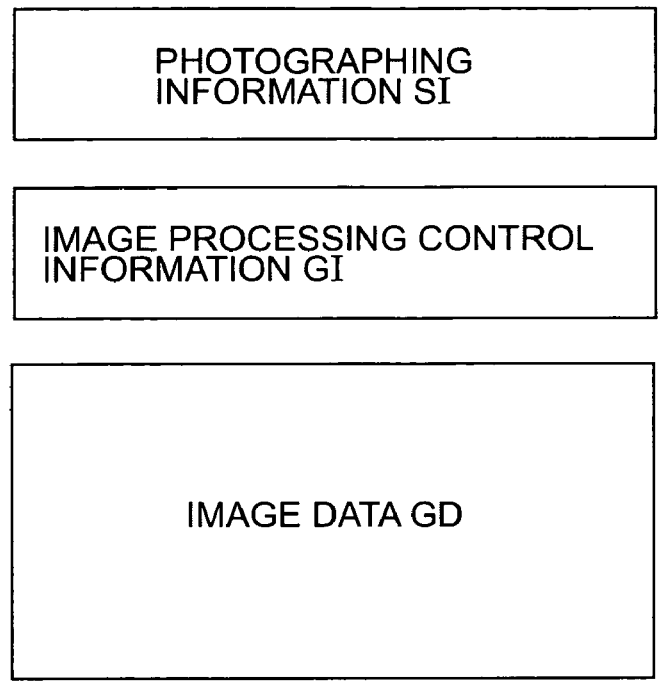
FIG. 5 illustrates the relationship among moving picture data GD, image processing control information GI, and photographing information SI.
Figure 6:
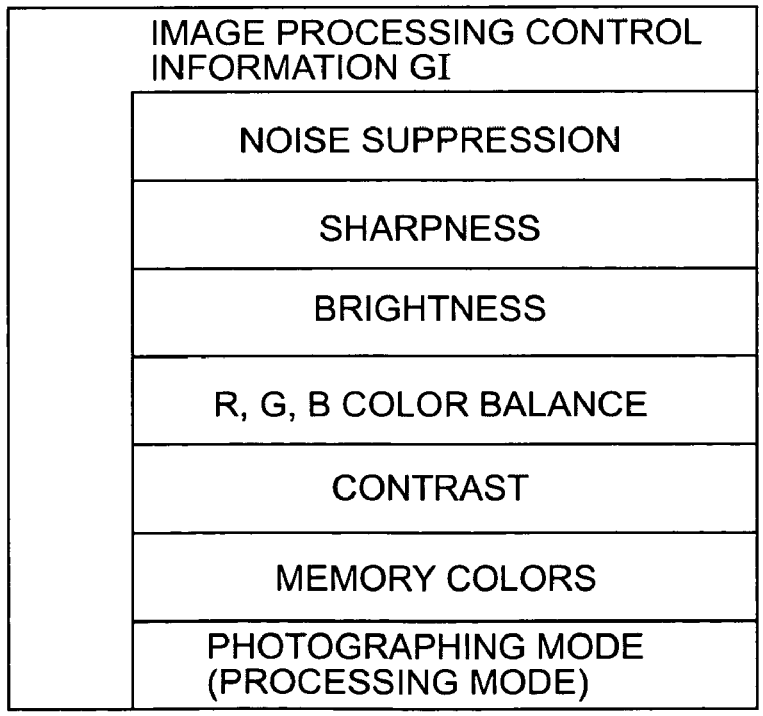
FIG. 6 illustrates examples of parameters recorded as the image processing control information GI.

The schematic configuration of the moving picture data GD and examples of parameters recorded as the image processing control information GI and the photographing information SI used in this embodiment are described below with reference to FIGS. 5 through 7. FIG. 5 is a schematic diagram illustrating the relationship among the moving picture data GD, the photographing information SI, and the image processing control information GI used in the first embodiment. FIG. 6 illustrates examples of parameters recorded as the image processing control information GI. FIG. 7 illustrates examples of parameters recorded as the photographing information SI. The data structure and the information structure shown in FIGS. 5 through 7 represent the data and information stored in a memory in a conceptual sense.

The photographing information SI and the image processing control information GI are generated, as shown in FIG. 5, in association with (related to) the moving picture data GD. The moving picture data GD is generated as a block having a certain length, that is, as a set of a plurality of frame images. The length of the moving picture data GD may be determined as follows. A predetermined number of frame images may form one moving picture data GD, or a certain scene may form one moving picture data GD based on the content of the moving picture data GD.

Figure 4A:
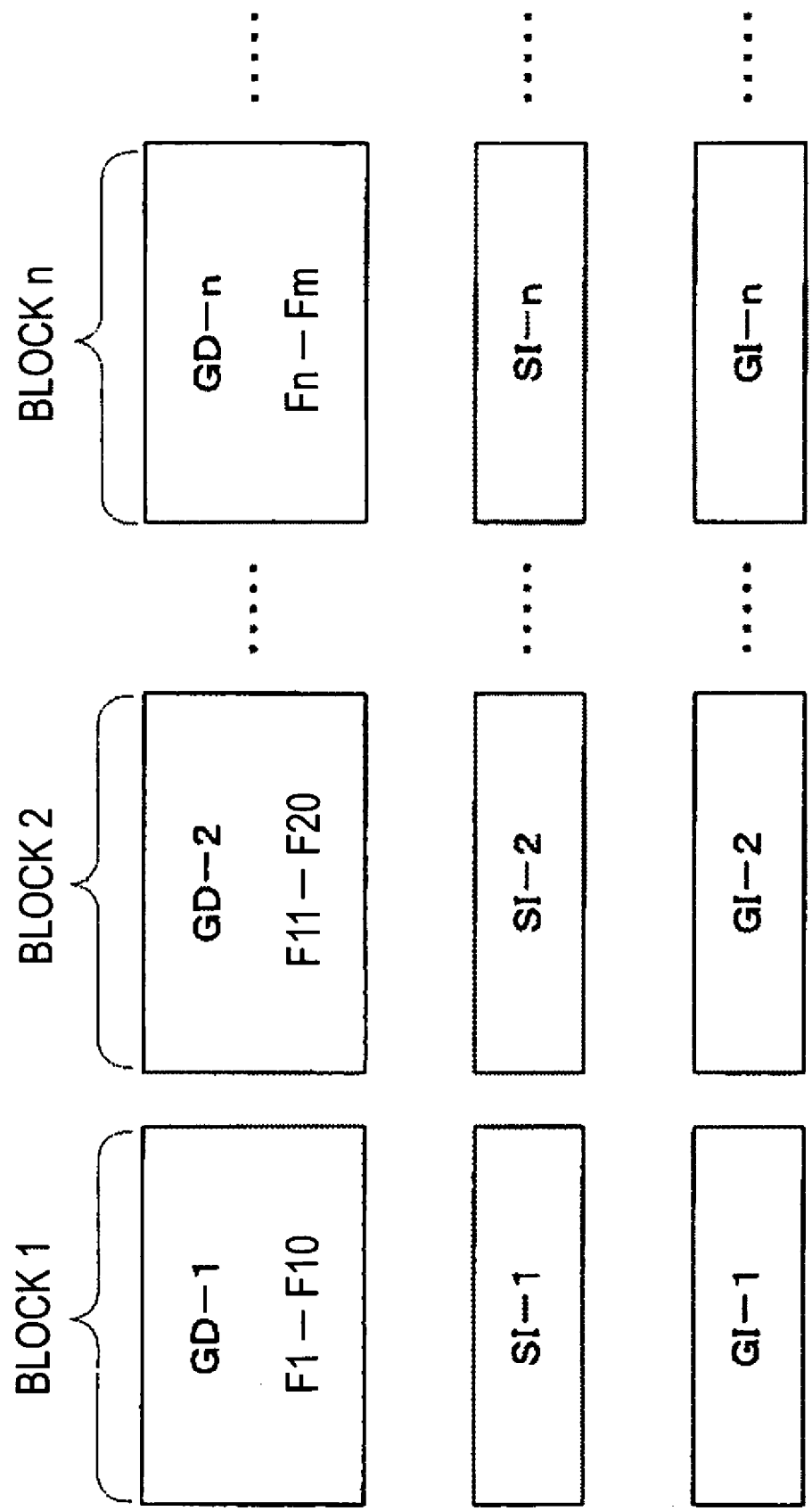
FIGS. 4A, 4B, and 4C illustrate the association of moving picture data GD, image processing control information GI, and photographing information SI.

More specifically, as shown in FIG. 4A, moving picture data GD (GD-1, GD-2, . . . , and GD-n) formed of a plurality of frame images is generated. In the example shown in FIG. 4A, the moving picture data GD-1 is formed of frames F1 through F10, the moving picture data GD-2 is formed of frames F11 through F20, and the moving picture data GD-n is formed of frames Fn through Fm. The photographing information SI (SI-1, SI-2, . . . , and SI-n) and the image processing control information GI (GI-1, GI-2, . . . , and GI-n) are generated in association with the moving picture data GD (GD-1, GD-2, . . . , and GD-n), respectively.

The parameters recorded as the photographing information SI includes, for example, as shown in FIG. 7, the time value, exposure mode, film sensitivity (ISO value), aperture value, photographing scene, and strobe ON/OFF, which represent statuses during the photographing operation.

The image processing control information GI is information experimentally determined so that desired output images can be obtained when moving picture data generated by a moving-picture-data generating device, such as the digital camera 10, is output from a predetermined image output device.

The parameters recorded as the image processing control information GI includes, for example, as shown in FIG. 6, noise suppression (noise suppression level), sharpness, brightness, R, G, B color balance, contrast, memory colors, and photographing mode (image processing mode corresponding to photographing conditions).

Figure 4B:
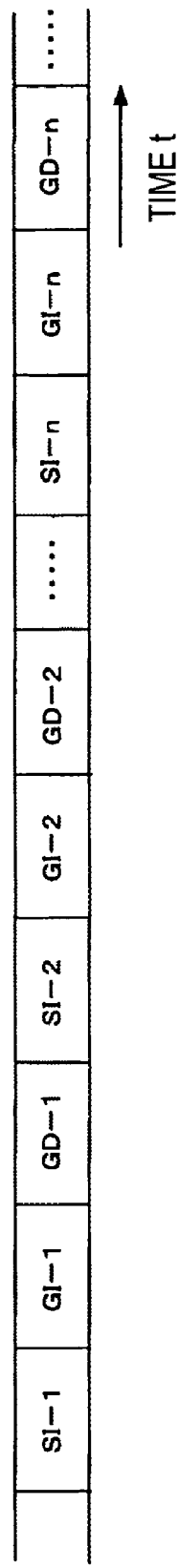
Figure 4C:
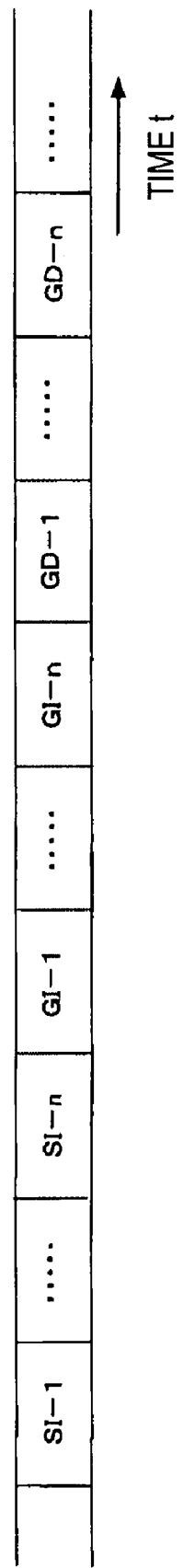

The transmission method for the moving picture data GD, the photographing information SI, and the image processing control information GI is schematically shown in FIGS. 4B and 4C. As stated above, the photographing information SI and the image processing control information GI are associated with the moving picture data GD as different data. Accordingly, when transmitting the three items of data to the portable device 20 or the display device 30 from the digital camera 10, they are transmitted in a time division manner as shown in FIGS. 4B and 4C. FIG. 4B illustrates an example in which the moving picture data GD, the photographing information SI, and the image processing control information GI are transmitted in units of blocks. In this example, after transmitting the first block containing the photographing information SI-1, the image processing control information GI-1, and the moving picture data GD-1, the second block containing the photographing information SI-2, the image processing control information GI-2, and the moving picture data GD-2 is transmitted. FIG. 4C illustrates an example in which the moving picture data GD, the photographing information SI, and the image processing control information GI are transmitted for a predetermined number of blocks (in this case, n blocks). In this example, the first through n-th blocks of photographing information SI-1 through SI-n are transmitted, and then, the first through n-th blocks of image processing control information GI-1 through GI-n are transmitted, and then, the first through n-th blocks of moving picture data GD-1 through GD-n are transmitted. In either example shown in FIG. 4B or 4C, it is preferable that the photographing information SI and the image processing control information GI be transmitted before sending the associated moving picture data GD. Accordingly, when receiving the moving picture data GD, a receiver device, such as the portable device 20, can quickly start image processing on the moving picture data GD based on the photographing information SI and the image processing control information GI that have already been received.

The image processing control information GI is determined by considering the characteristics of the digital camera 10 when generating the moving picture data GD and the image output characteristics of the color printer 50. Accordingly, if moving picture data subjected to image processing by using the image processing control information GI is output from an image output device (for example, the portable device 20 or the display device 30) having image output characteristics different from those of the color printer 50, an output image may be different from that from the color printer 50.

In this embodiment, therefore, the difference of the image quality depending on the image output devices can be eliminated or reduced in accordance with the image output characteristics of the image output device by using adjusting information for adjusting the image processing control information GI. The adjusting information may be difference information for matching the image processing control information GI to the image output characteristics of the image output device, substituting information for substituting the image processing control information GI, or generating information for generating new image processing control information matching the image output characteristics of the image output device based on the image processing control information GI. The adjusting information may be contained in the image processing control information GI or be stored in a storage unit of each image output device.

Figure 3:
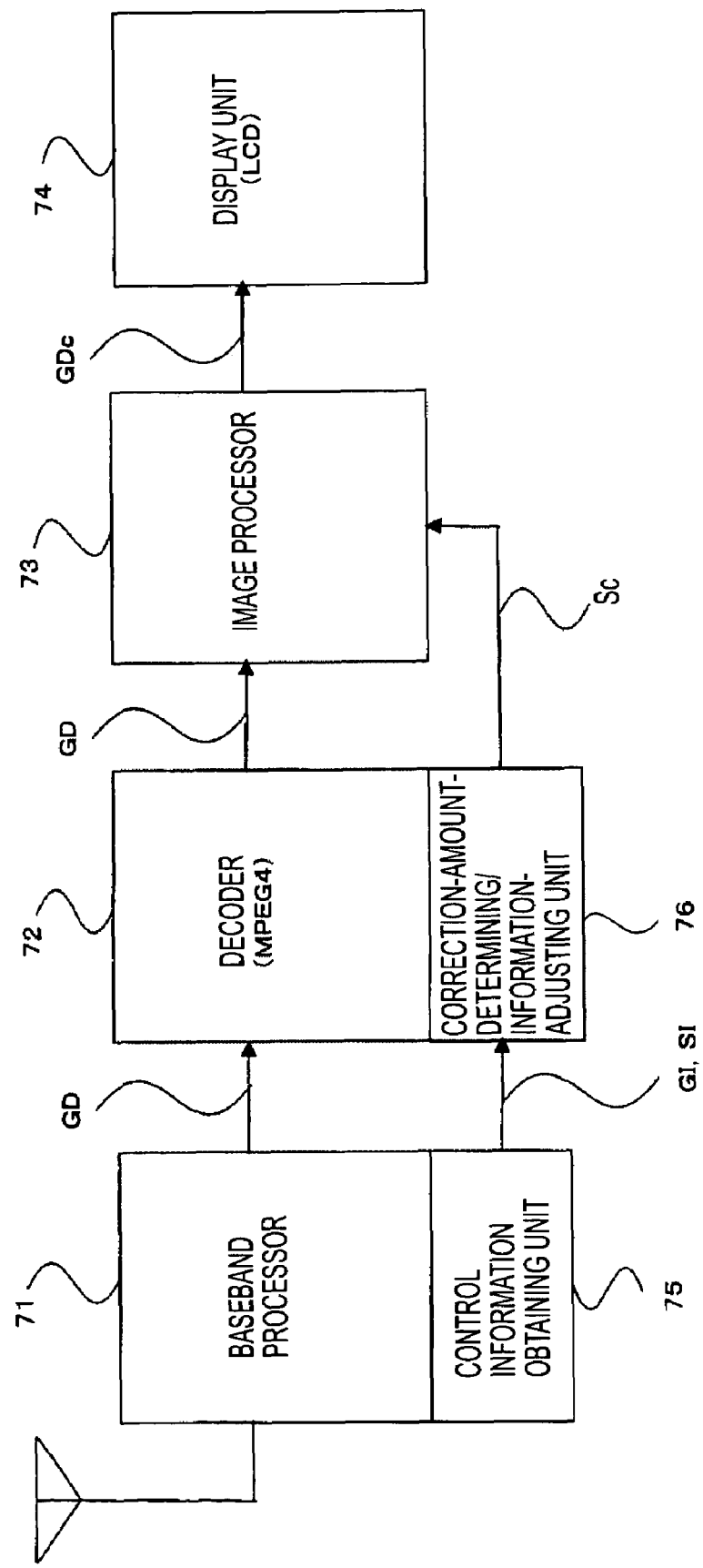
FIG. 3 is a functional block diagram illustrating the image processing apparatus according to the first embodiment of the invention.

FIG. 3 is a functional block diagram illustrating the functions of the portable device 20 and the display device 30. As shown in FIG. 3, a baseband processor 71 demultiplexes data input from an external source (antenna for the portable device 20 in FIG. 3) into the moving picture data GD and control information containing the image processing control information GI and the photographing information SI. A decoder 72, for example, an MPEG decoder, then decodes the moving picture data GD, and sends it to an image processor 73. Meanwhile, a control information obtaining unit 75 obtains the control information from the baseband processor 71 and extracts the image processing control information GI and the photographing information SI, and sends them to a correction-amount-determining/information-adjusting unit 76.

The correction-amount-determining/information-adjusting unit 76 obtains analytic information concerning the moving picture data GD from the decoder 72 and determines the amount by which the moving picture data GD is to be corrected. The correction-amount-determining/information-adjusting unit 76 obtains adjusting information which has been set in the portable device 20 and adjusts the image processing control information GI, and then further adjusts the image processing control information GI and the photographing information SI. Then, the correction-amount-determining/information-adjusting unit 76 changes and determines the correction amount based on the adjusted image processing control information GI and the photographing information SI, and then supplies a signal Sc indicating the correction amount to the image processor 73.

The image processor 73 performs image processing on the moving picture data GD supplied from the decoder 72 based on the correction amount determined from the adjusted image processing control information GI and the photographing information SI, and supplies the processed moving picture data GDc to a display unit 74, such as a liquid crystal display panel. Then, the display unit 74 can display images subjected to the image processing based on the image processing control information GI and the photographing information SI which has been set in association with the moving picture data GD and is also adjusted in accordance with the characteristics of, for example, the portable device 20.

Figure 8:
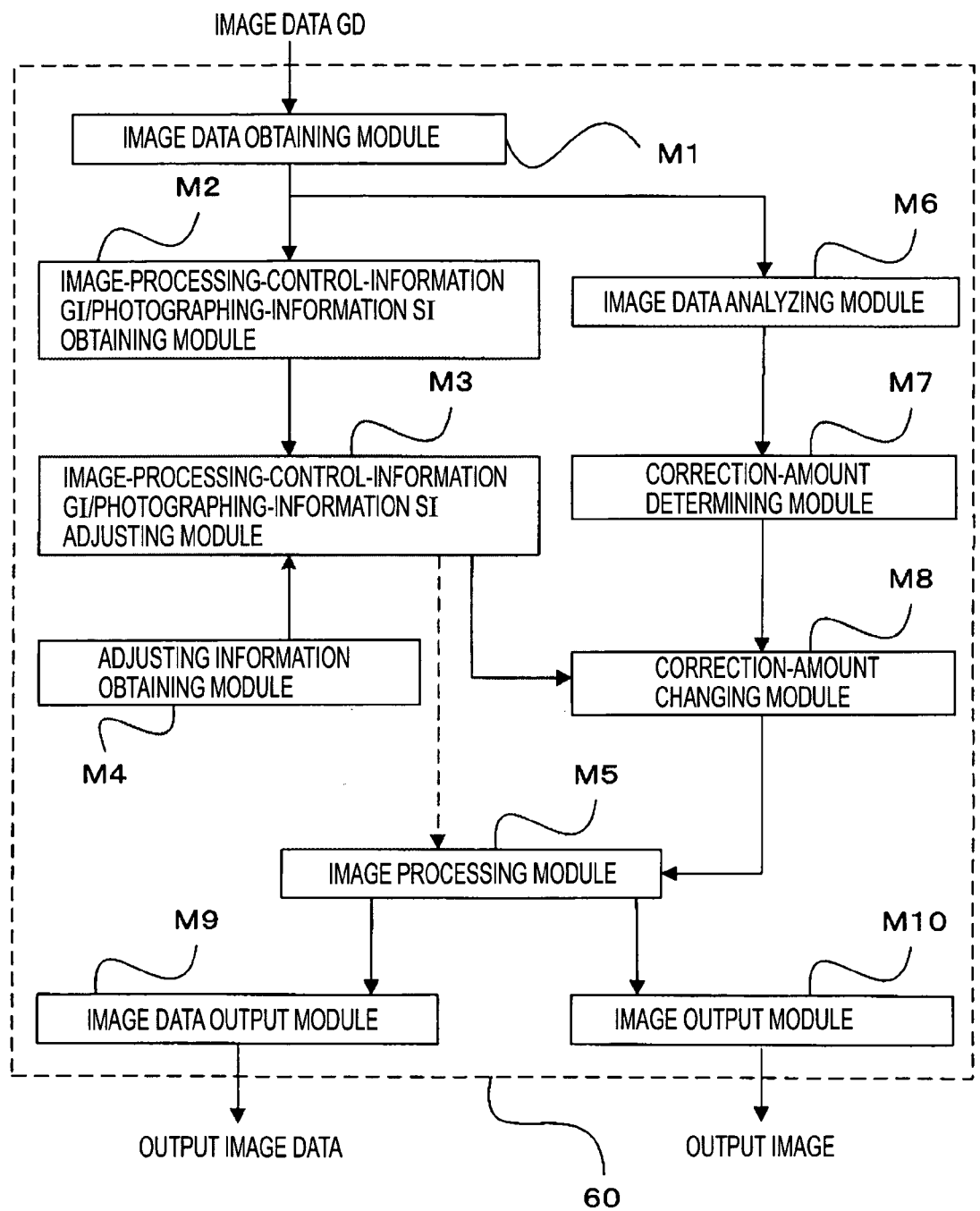
FIG. 8 is a block diagram illustrating functional modules of the image processing apparatus according to the first embodiment of the invention.

A description is now given, with reference to FIG. 8, of modules implemented by the control circuit 60 of the portable device 20 or the display device 30. The modules shown in FIG. 8 may be implemented by the CPU 601 singly or the overall control circuit 60, and may be implemented by either hardware or software. The functional modules described below can also be applied to the personal computer 40.

The moving picture data GD to be subjected to image processing is obtained by an image data obtaining module M1. The image processing control information GI and the photographing information SI associated with the moving picture data GD are obtained by an image-processing-control-information GI/photographing-information SI obtaining module M2. The obtained image processing control information GI and photographing information SI are adjusted in accordance with an image output device by an image-processing-control-information GI/photographing-information SI adjusting module M3.

Generally, the image processing control information GI and the photographing information SI are set so that optimal output images (quality) can be obtained in accordance with the relationship between a specific image data generating device, for example, the digital camera 10, and a specific image output device. Accordingly, when image processing is executed by using the image processing control information GI and the photographing information SI in an image output device different from the specific image output device, the image processing control information GI and the photographing information SI is desirably adjusted in accordance with the image output characteristics of the image output device.

Then, the image processing control information GI and the photographing information SI are adjusted by the image-processing-control-information GI/photographing-information SI adjusting module M3 by using the adjusting information obtained by an adjusting information obtaining module M4. The adjusting information may be included in the image processing control information GI or may be prerecorded in the HD/ROM 603 of the control circuit 60.

For performing image processing on the moving picture data GD by using a reference value, the moving picture data GD is analyzed in an image data analyzing module M6, and the amount by which the moving picture data GD is corrected during the image processing is determined by a correction-amount determining module M7 based on the analysis result. The determined correction amount is changed in a correction-amount changing module M8 by reflecting the image processing control information GI and the photographing information SI adjusted based on the adjusting information.

An image processing module M5 then performs image processing on the moving picture data GD by using the changed correction amount. The moving picture data GD is then sent to the display driving controller 63 by an image data output module M9 as output image data. If the control circuit 60 is provided with an image output module M10, the moving picture data GD is output as an output image to the display unit 21 or 31 via the image output module M10.

In the image processing module M5, image processing may be performed without using the changed correction amount, for example, by directly using the parameters recorded as the adjusted image processing control information GI.

In the configuration of the controller 60 shown in FIG. 8, the image data obtaining module M1 corresponds to the baseband processor 71 shown in FIG. 3, and the image-processing-control-information GI/photographing-information SI obtaining module M2 corresponds to the control information obtaining unit 75. The image-processing-control-information GI/photographing-information SI adjusting module M3, the adjusting information obtaining module M4, the image data analyzing module M6, the correction-amount determining module M7, and the correction-amount changing module M8 correspond to the correction-amount-determining/information-adjusting unit 76. The image processing module M5 corresponds to the image processor 73.

Figure 9:
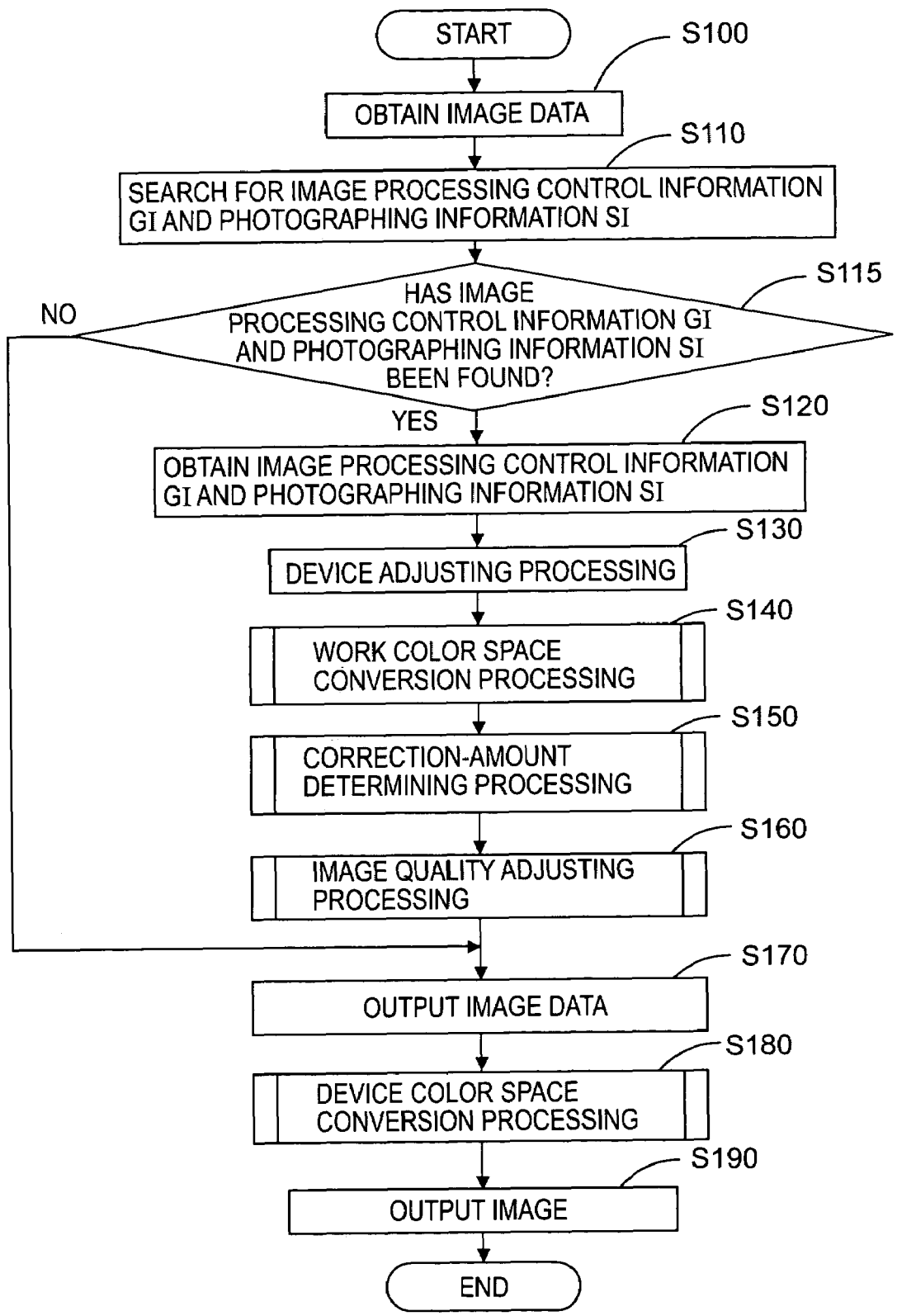
FIG. 9 is a flowchart illustrating image processing according to the first embodiment of the invention.
Figure 10:
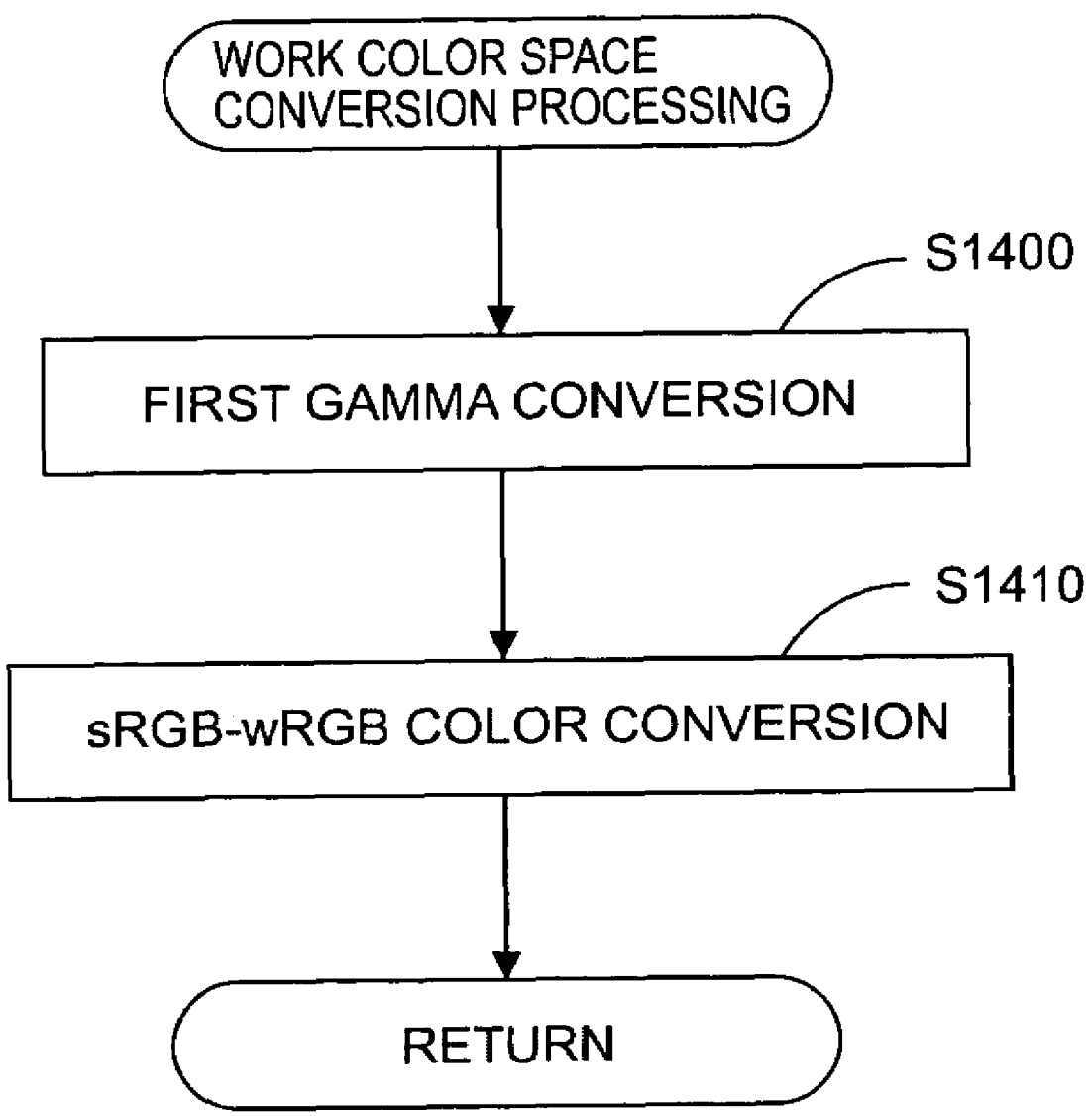
FIG. 10 is a flowchart illustrating work color space conversion processing of the image processing shown in FIG. 9.
Figure 11:
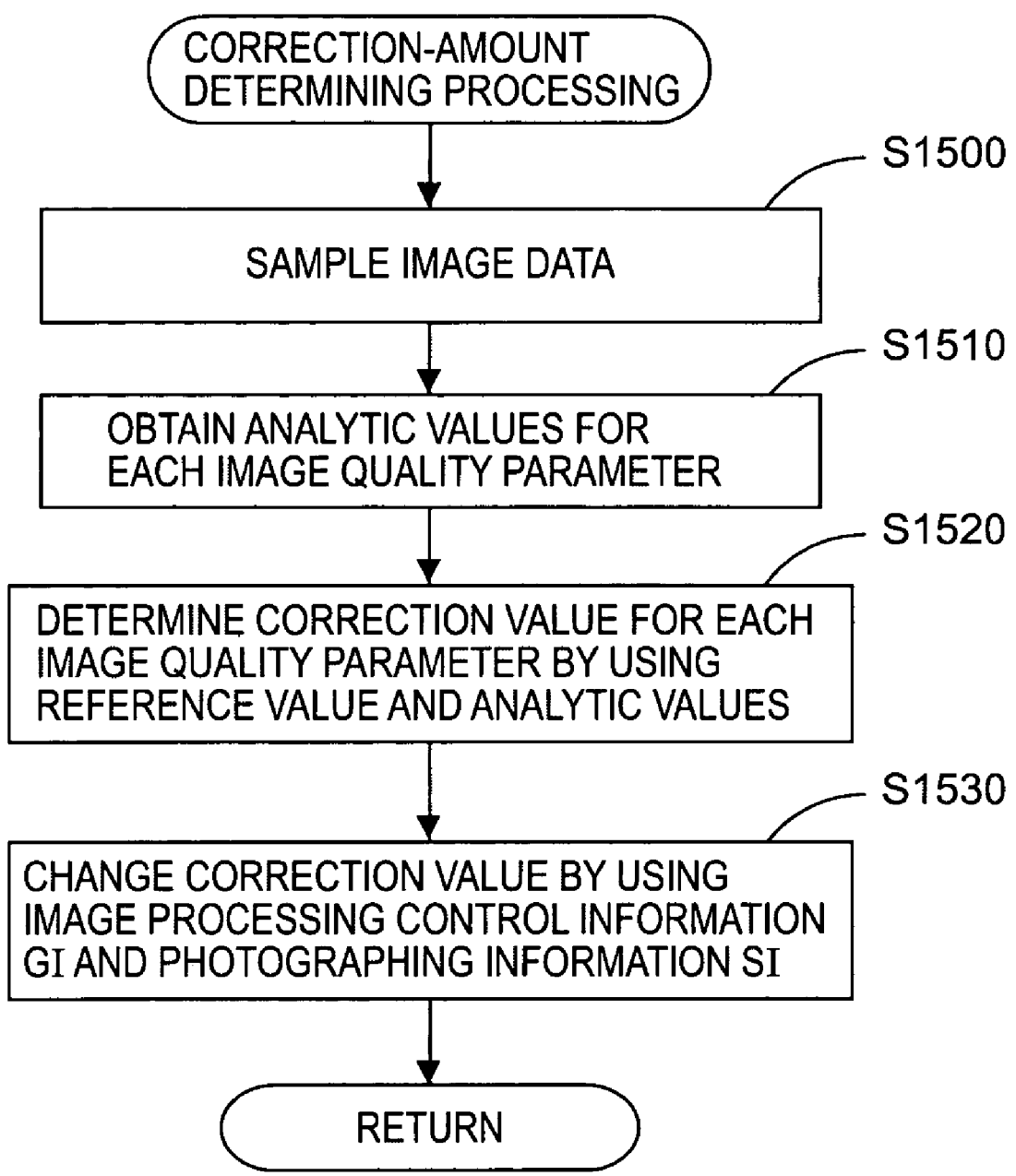
FIG. 11 is a flowchart illustrating correction-amount determining processing of the image processing shown in FIG. 9.
Figure 12:
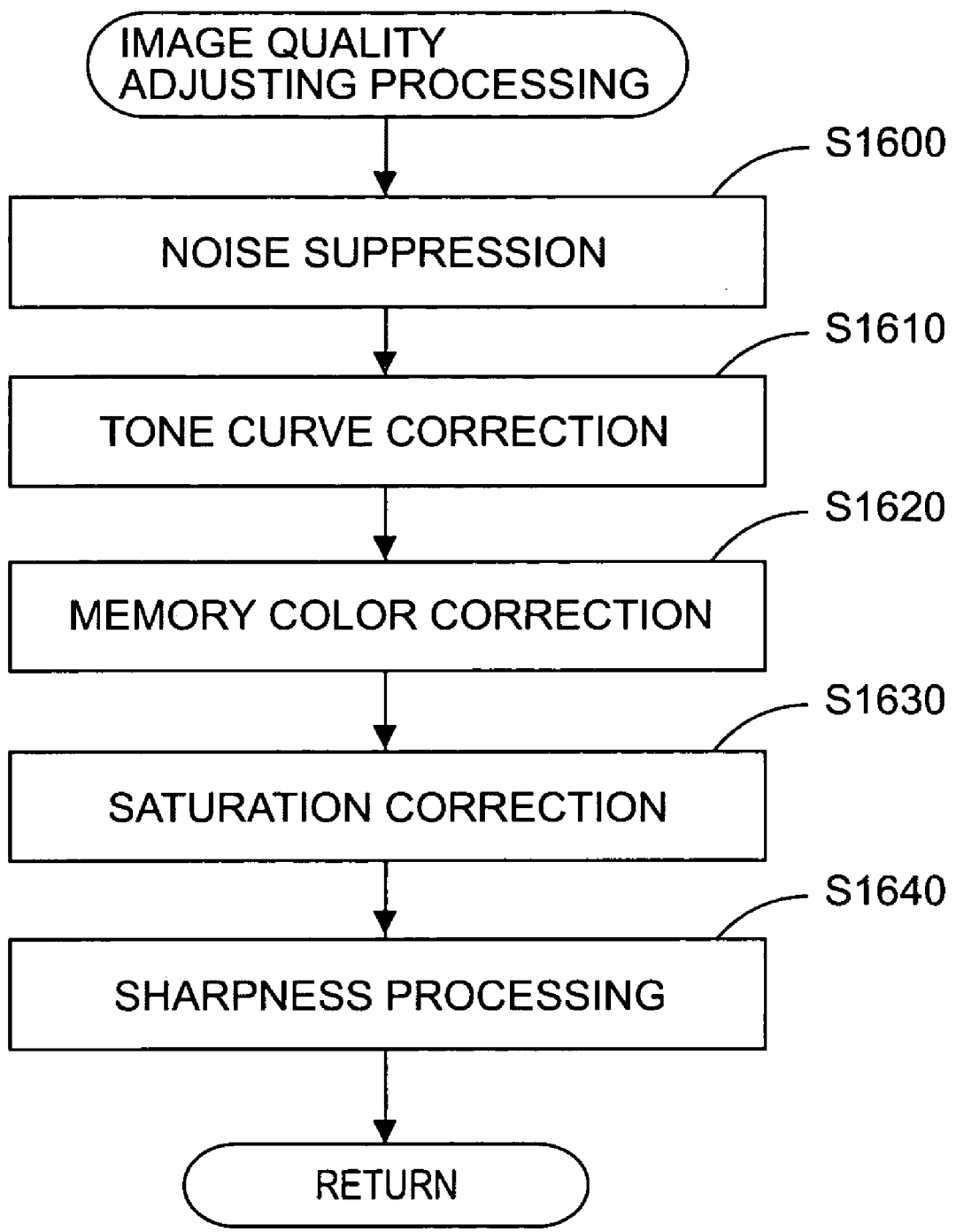
FIG. 12 is a flowchart illustrating image quality adjusting processing of the image processing shown in FIG. 9.
Figure 13:
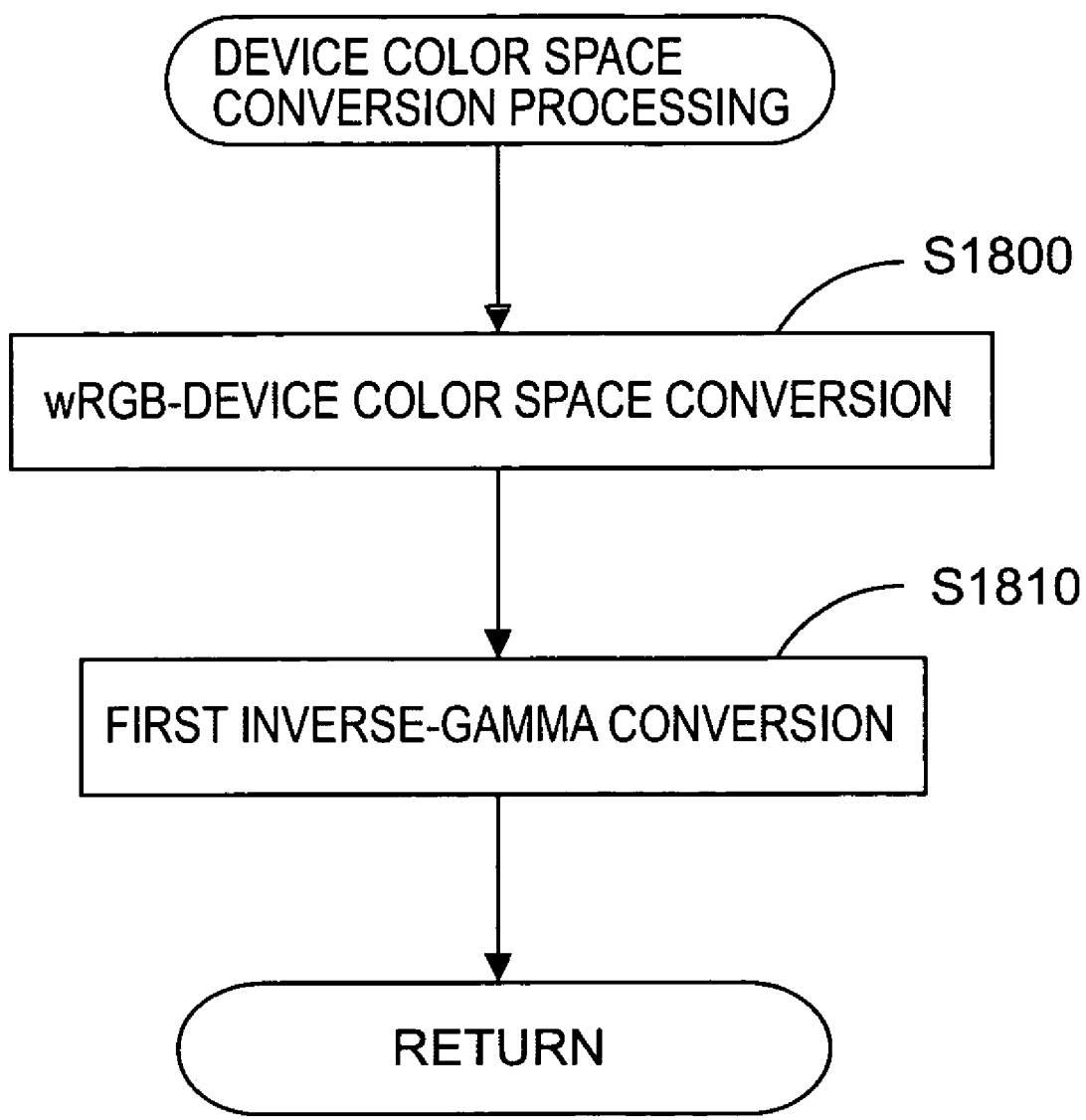
FIG. 13 is a flowchart illustrating device color space conversion processing of the image processing shown in FIG. 9.

A description is now given, with reference to the flowcharts of FIGS. 9 through 13, of image processing performed by the portable device 20 or the display device 30 according to the first embodiment of the invention. Reference is first given to FIG. 9 illustrating the routine of overall image processing performed by the portable device 20 or the display device 30.

The image processing performed in this embodiment may be started when selecting desired moving picture data GD by operating a key or a touch panel of the portable device 20 or the display device 30 or when the moving picture data GD is received by the portable device 20 or the display device 30.

When starting the image processing, in step S100, the control circuit 60 (CPU 601) obtains the selected moving picture data GD and temporarily stores it in the RAM 602. The moving picture data GD may be selected by using the digital camera 10 connected to the portable device 20 or the display device 30 by wired or wireless means, or may be selected from a plurality of moving picture data GD stored in the memory card MC by using the portable device 20 or the display device 30. Alternatively, desired moving picture data GD may be selected from a plurality of moving picture data GD stored in a server via a network.

In step S110, the CPU 601 searches a network or the memory card MC for the image processing control information GI and the photographing information SI associated with the selected moving picture data GD. The CPU 601 then determines in step S115 whether the image processing control information GI and the photographing information SI can be found. If the image processing control information GI and the photographing information SI are found, the CPU 601 proceeds to step S120 to obtain the information GI and SI. If the image processing control information GI and the photographing information SI cannot be found in step S115, the CPU 601 proceeds to step S170 without performing image adjusting processing using the image processing control information GI and the photographing information SI.

In step S130, the CPU 601 performs device adjusting processing. As stated above, generally, the image processing control information GI is optimized for a combination of a specific image data generating device and a specific image output device, for example, the color printer 50. Accordingly, if an image output device, such as the portable device 20 or the display device 30, different from the specific image output device is used, the quality of a resulting output image becomes different from that output from the color printer 50.

In this embodiment, therefore, the image processing control information GI is adjusted by using the adjusting information preset for each device so that the quality of the display output image of the portable device 20 or the display device 30 is equal to or similar to that of the printed output image of the color printer 50. The adjusting information may be difference information between the parameters for obtaining the image quality from the portable device 20 or the display device 30 similar to that of the color printer 50 or may be new display parameters to be used instead of the parameters recorded as the image processing control information GI.

The image output characteristics of liquid crystal panels are very different depending on the liquid crystal panels. Accordingly, it is desirable that the adjusting information be preset for each liquid crystal panel. The adjusting information may be included in the image processing control information GI or may be stored in the HD/ROM 603 of each display device 30 as unique adjusting information. Alternatively, the adjusting information may be dynamically generated in the display device 30 based on the image processing control information GI.

The adjusting information (differences of parameter values and substituting parameters) includes, for example, specifying the white points, adjusting the contrast, saturation, and color hue, noise-suppression ON/OFF, and sharpness processing ON/OFF.

(1) Since the color temperature is different between individual image output devices, the white points are specified to adjust the color temperature. For example, if the display color temperature is high, about 9300 K, the white points can be specified as R=(237, 255), G=(255, 251), and B=(255, 222). Then, images can be displayed on the display units 21 and 31 with similar color balances.
(2) The reproducible color gamut is different between individual image output devices, thereby causing a difference in the contrast and making resulting images appear very different. Thus, by adjusting the tone curve, the contrast of images displayed on the display units 21 and 31 can be almost uniform.
(3) Since the saturation is different between individual image output devices, it should be adjusted so that the output images on the display units 21 and 31 can appear similar to the output images of the color printer 50.
(4) If the color hue is different between individual output devices, the adjustment to the color space conversion matrix, the correction for the memory colors, or specifying the color gamut based on the hue-saturation-brightness (HSB) can be performed by using the adjusting information.

Then, in step S140, the CPU 601 performs work color space conversion processing for converting the color space of the obtained moving picture data GD into the work color space. Details of the work color space conversion processing are discussed below with reference to the flowchart of FIG. 10. In this conversion processing, the color space of the moving picture data GD is converted into the color space used for performing image adjusting processing on the image data, i.e., into the work color space. In this case, using a color space having a wider color gamut enhances the effective use of pixel data forming the image data after adjusting the image quality.

Accordingly, in this embodiment, the color space of the moving picture data GD is converted from the sRGB color space, which is generally used as the RGB color space, into the wRGB color space having a wider color gamut than the sRGB color space.

Normally, since the moving picture data GD obtained from the digital camera 10 is YCbCr color space data, it is first converted into sRGB color space image data, which is generally used in image processing. In YCbCr-RGB color conversion, the matrix S, which is well known for those skill in the art, is used. If the moving picture data GD is sRGB data, color conversion using the matrix S is not necessary. The following color conversion processing is described, assuming that the moving picture data GD is sRGB color space image data.

In step S1400, the CPU 601 performs first gamma conversion processing on the moving picture data GD. Generally, the color conversion processing is performed in a device-independent color space, such as XYZ or Lab, and sRGB-XYZ color conversion processing and XYZ-WRGB color conversion processing using a matrix is performed. To increase the precision of the color conversion processing, it is necessary that the input/output characteristics (gamma characteristics) of the moving picture data GD should be linear. The gamma used in this conversion processing is a gamma value generally used in inverse-gamma conversion processing when image data is generated in the digital camera 10.

In S1410, the CPU 601 performs sRGB-XYZ color conversion processing and XYZ-wRGB color conversion processing using a matrix on the linear moving picture data GD to convert the color space of the moving picture data GD into the work color space wRGB. The CPU 601 then exits from this subroutine and returns to the main routine shown in FIG. 9.

In step S150 of FIG. 9, the CPU 601 performs correction-amount determining processing. Details of the correction-amount determining processing are discussed below with reference to the flowchart of FIG. 11. In this processing, the correction amount is determined for automatic image quality adjusting for correcting the parameter values for the moving picture data GD equal to or close to the reference values.

In step S1500, the CPU 601 samples the moving picture data GD or rough data of the image picture data GD (for example, thumbnail image data) for each pixel or every predetermined number of pixels. Then, in step S1510, the CPU 601 obtains from each sampled pixel data analytic values (statistic value and characteristic value) for each image quality parameter concerning the quality of the moving picture data GD.

In step S1520, the CPU 601 obtains a preset reference value for each image quality parameter, and determines the correction value for each image quality parameter by using the reference value and the analytic values. More specifically, the CPU 601 determines the correction value by using the arithmetic expression preset for each image quality parameter so that the difference between the analytic values of the image quality parameter and the reference value can be eliminated or reduced. That is, in this embodiment, by analyzing the characteristics of the moving picture data GD, the correction values can be determined depending on the image quality of the moving picture data GD. The correction values may be used as new image quality parameters or for increasing or decreasing the analytic values of the image quality parameters.

In step S1530, the CPU 601 changes the correction value determined for each image quality parameter by using the image processing control information GI and the photographing information SI. The CPU 601 then exits from this subroutine and returns to the main routine shown in FIG. 9. In this processing, the image quality characteristics generated depending on a combination of an image data generating device and an image output device and the photographing information SI which has been set when the image data is generated are used. Accordingly, information (conditions) that cannot be obtained merely by analyzing the moving picture data GD can be reflected in the correction values determined according to the image quality of the moving picture data GD. In this embodiment, the image processing control information GI has been adjusted by the adjusting information so that the quality of images output from the portable device 20 or the display device 30 is comparable to that of images output from the color printer 50. Accordingly, the difference of the image quality caused by different image output characteristics of image output devices can be eliminated or reduced.

More specifically, if the correction values are used for increasing or decreasing the analytic values of the image quality parameters, the image processing control information GI and the photographing information SI are used for changing the level of an increase or a decrease in the image quality parameters. If the correction values are used as new image quality parameters, the image processing control information GI and the photographing information SI are used for generating new image quality parameters. If the image processing control information GI includes parameters manually set by a photographer, such manual parameters may be added to the correction values.

Then, in step S160, the CPU 601 performs image quality adjusting processing on the moving picture data GD by using the changed correction values. Details of the image quality adjusting processing are discussed below with reference to the flowchart of FIG. 12. In step S1600, the CPU 601 performs noise suppression processing on the moving picture data GD. In this case, the adjusting information may define whether or not the noise suppression processing is performed or may adjust the level of noise suppression. The noise suppression processing is computation processing that requires a comparatively high load. In display devices having small screen sizes, the effect of the noise suppression processing is not noticeable. Accordingly, in the portable device 20 generally having a small screen size, the noise suppression processing may be skipped in view of the high computation load and the weak effect of the noise suppression processing.

In step S1610, the CPU 601 adjusts the tone curve by using the changed correction values and performs the image quality adjusting processing on the moving picture data GD by using the tone curve. The image quality adjusting processing using the tone curve is for adjusting the image quality parameters concerning the brightness, color balance, and contrast. The tone curve can be adjusted by changing a passing point of the tone curve at a correction point which is set for each image quality parameter.

Then, in step S1620, the CPU 601 replaces the colors corresponding to the preset memory colors by colors defined as the memory colors. As the memory colors, aesthetically pleasant-looking colors are defined for, for example, flesh color, sky blue, green, and red.

In step S1630, the CPU 601 performs saturation correction. The saturation correction using the correction values (adjusting amounts) can be conducted by the following equations:

$$R_a = \left(R_b - \left(\frac{R_b + G_b + B_b}{3}\right)\right) \times \frac{R}{100} + R_b$$

$$G_a = \left(G_b - \left(\frac{R_b + G_b + B_b}{3}\right)\right) \times \frac{G}{100} + G_b$$

$$B_a = \left(B_b - \left(\frac{R_b + G_b + B_b}{3}\right)\right) \times \frac{B}{100} + B_b$$

where Rb, Gb, and Bb indicate saturation values before being corrected, Ra, Ga, and Ba represent saturation values after being corrected, and R, G, and B designate the correction values.

In step S1640, the CPU 601 performs sharpness processing and then completes the image quality adjusting processing. The CPU 601 then exits from this subroutine and returns to the main routine shown in FIG. 9. The adjusting information may define whether or not the sharpness processing is performed or may adjust the level of the sharpness. In display devices having small screen sizes, the effect of the sharpness processing is not noticeable. Accordingly, in the portable device 20 generally having a small screen size, the sharpness processing may be skipped in view of the weak effect of the sharpness processing and also with a view to reducing the computation load.

In step S170, the CPU 601 outputs the resulting image data. Then, in step S180, the CPU 601 converts the work color space of the moving picture data GD subjected to the image quality adjusting processing into the device color space. Details of the device color space conversion processing are discussed below with reference to the flowchart of FIG. 13. In this processing, the color space of the moving picture data GD is converted from the work color space used for the image quality adjusting processing into the color space of the image output device. Normally, image output devices (display devices) that display images are designed for satisfying the sRGB color space. In contrast, several display image output devices (display devices) are designed based on unique color spaces.

In step S1800, the CPU 601 performs wRGB-XYZ color conversion processing and XYZ-sRGB color conversion processing or XYZ-device color space conversion processing using a matrix, or wRGB-sRGB color conversion processing or wRGB-device color space conversion processing by using a look-up table, thereby converting the color space of the moving picture data GD into the device color space.

In step S1810, the CPU 601 performs first inverse-gamma conversion processing on the moving picture data GD. The CPU 601 then exits from this subroutine and returns to the main routine shown in FIG. 9. That is, the gamma characteristic of the moving picture data GD are changed to the gamma characteristics of the display unit 21 or 31. More specifically, the inverse-gamma conversion processing using the gamma values of the display unit 21 or 31 is executed.

In step S190, the CPU 601 outputs the resulting image via the display driving controller 63 and completes the main routine.

As is seen from the foregoing description, the portable device 20 or the display device 30 of the first embodiment can display images of a quality comparable to the quality of images output from the color printer 50 by using the image processing control information GI defined for a combination of the digital camera 10 and the color printer 50. That is, although the portable device 20 or the display device 30 has image output characteristics different from those of the color printer 50, the difference of the image quality caused by the difference in the image output characteristics can be eliminated or reduced by adjusting the image processing control information GI using the adjusting information. Thus, by using the image processing control information GI defined for a specific image output device, the quality of output images from another image output device can be the same as or close to the quality of images output from the specific image output device.

In the first embodiment, images having a quality comparable to or close to the quality of images output from a specific image output device can be obtained in a plurality of image output devices without the need to store the image processing control information GI in each image output device.

Additionally, in the first embodiment, in the portable device 20 having the small display unit 21, the noise suppression processing and sharpness processing, which do not produce a noticeable effect on small display units, can be skipped. As a result, the computation load and the time required for the image quality adjusting processing can be reduced while adjusting the image quality using the image processing control information GI.

In the first embodiment, the image processing control information GI is determined in consideration of the moving-picture-data characteristics of the digital camera 10 when generating the moving picture data GD and the image output characteristics of the color printer 50, and is adjusted to the characteristics of the portable device 20 or the display device 30 by using the adjusting information. However, the invention is not restricted to this mode. For example, the image processing control information GI may be generated by considering the characteristics of the portable device 20 or the display device 30, and may be adjusted when the moving picture data GD is displayed in another device.

Second Embodiment

In the first embodiment, moving image data is generated by the digital camera 10. According to a second embodiment of the invention, moving picture data is transmitted by television broadcasting. In terrestrial digital broadcasting, in addition to digital moving picture data, electronic program guide (EPG) data is transmitted. The EPG data includes information concerning a broadcasting timetable and categories of programs. The programs are classified into several categories, such as news, weather forecasts, variety programs, and sport, and the EPG data indicates to which category each program belong. Accordingly, image processing control information suitable for each category is preset, and the image processing control information is determined in accordance with the category of a program to perform image processing. In this manner, the invention can also be implemented for digital television broadcasting from broadcasting stations.

Figure 14:
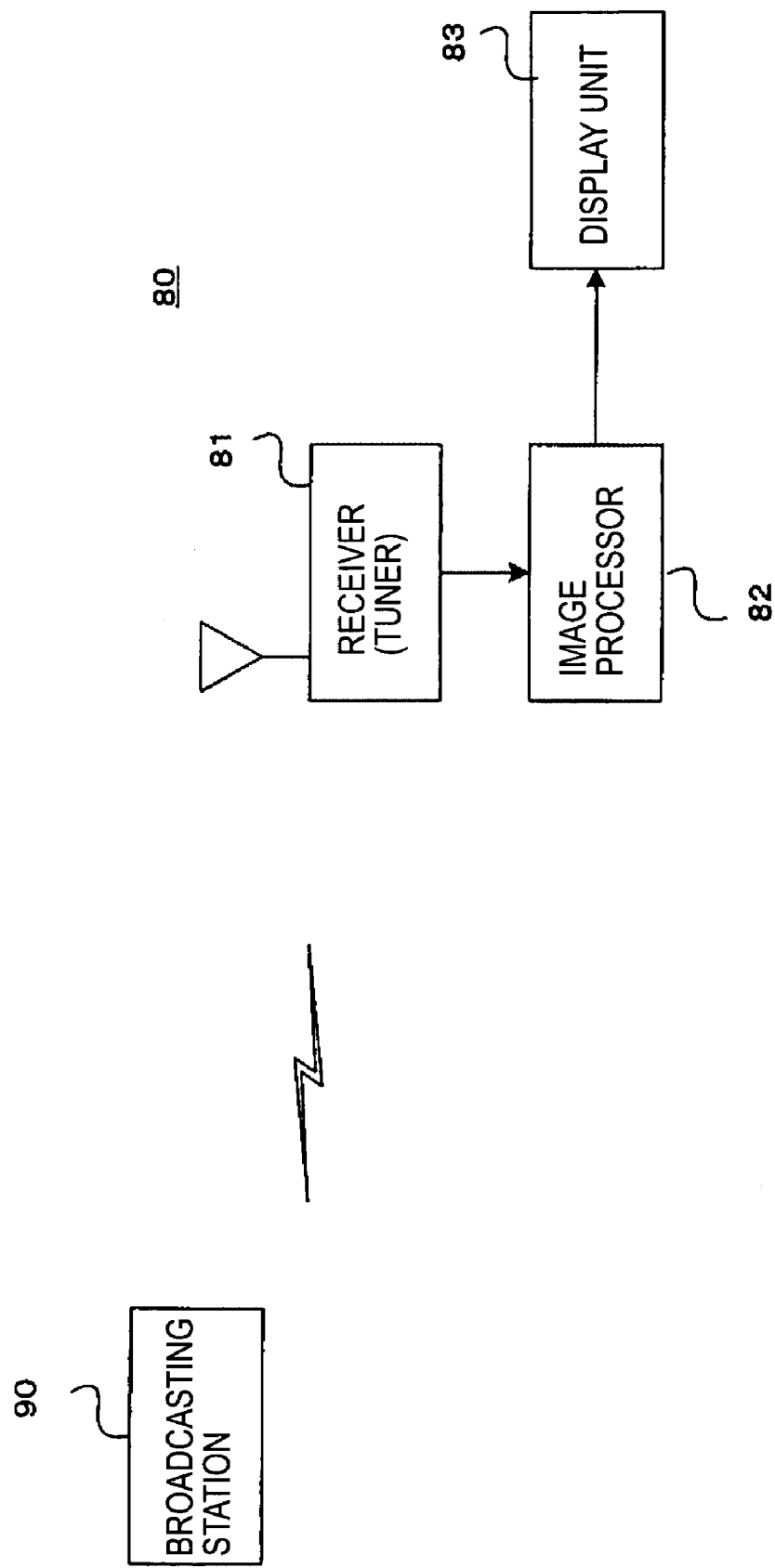
FIG. 14 is a block diagram illustrating the schematic configuration of a system according to a second embodiment of the invention.

FIG. 14 is a schematic block diagram illustrating the system configuration of the second embodiment. Broadcasting waves transmitted from a broadcasting station 90 are received by a digital television receiving system 80 installed in, for example, a home. More specifically, a receiver (tuner) 81 extracts moving picture data and EPG data from the broadcasting waves received by an antenna and sends the data to an image processor 82.

The image processor 82 stores image processing control information which has been determined for each program category, as information for associating categories with image processing control information, such as image processing control information A for category "news" programs, image processing control information B for category "sport" programs, and image processing control information C for category "drama" programs. More specifically, for the category "news" programs involving the indication of subtitles, the image processing control information A indicates that edge enhancement is performed for displaying clear letters. For category "drama" programs having many scenes showing the expressions of actors and actresses, the image processing control information C indicates that memory colors for the complexion are used.

The image processor 82 obtains the image processing control information according to the category of the program, and performs image processing by using the image processing control information. The image processor 82 then sends the processed image data to a display unit 83, and the display unit 83 displays the image data.

According to the second embodiment, television broadcasting can be used as an image source, and image processing suitable for the content of a program can be performed, thereby making it possible to display high-quality moving pictures.

What is claimed is:

1. An image processing apparatus, comprising:
a moving-picture-data obtaining unit for obtaining moving picture data generated by an input image device, said moving picture data comprising a plurality of blocks;
a connection unit connectable to a first image output device which is configured to reproduce images from said moving picture data;
an image-processing-control-information obtaining unit for obtaining image processing control information associated with each block of the moving picture data, the image processing control information defining image processing conditions and being determined by both
(i) characteristics of the image input device when said moving picture data was generated, and
(ii) image output characteristics of a second image output device which was predetermined to reproduce images from said moving picture data, the image output characteristics of the second image output device are different from image output characteristics of the first image output device;
an adjusting-information obtaining unit for obtaining adjusting information for adjusting the image processing control information in accordance with the image output characteristics of the first image output device;

an adjusting unit for adjusting the obtained image processing control information by using the obtained adjusting information;

an image processor for performing image processing on each block of the moving picture data by using the adjusted image processing control information; and an output unit for outputting, through the connection unit, the moving picture data that has been subjected to the image processing to the first image output device;

wherein the image processing control information includes more than one selected from the group consisting of noise suppression, sharpness, brightness, R, G, B color balance, contrast, and memory colors;

wherein said blocks comprise:

a first block consisting of the moving-picture-data of a plurality of frame images, and a second block consisting of the image-processing-control-information associated with said moving-picture-data of said frame images, wherein said second block precedes the first block.

2. The image processing apparatus according to claim 1, further comprising:

a receiver for receiving digital broadcasting waves from a broadcasting station to generate broadcasting data; and a program-table-data obtaining unit for obtaining program table data from the broadcasting data, wherein the moving-picture-data obtaining unit is arranged for obtaining the moving picture data in said blocks from the broadcasting data, and the image-processing-control-information obtaining unit is arranged for obtaining the image processing control information based on the program table data.

3. The image processing apparatus according to claim 1, said frame images corresponding to one scene.

4. The image processing apparatus according to claim 1, wherein the moving-picture-data obtaining unit is arranged for obtaining the moving picture data after the image-processing-control-information associated with the moving-picture-data is obtained by the image-processing-control-information unit.

5. The image processing apparatus according to claim 1, wherein each of said blocks includes both the moving-picture-data and the image-processing-control-information associated with said moving-picture-data with the image-processing-control-information preceding the associated moving-picture-data.

6. The image processing apparatus according to claim 1, wherein the image-processing-control-information obtaining unit is further configured for obtaining, in addition to the image processing control information, photographing information concerning photographing conditions which were set by the image input device when said moving picture data was generated; and the image processor is further configured for performing the image processing on each block of the moving picture data by using the adjusted image processing control information and the photographing information;

wherein said photographing information comprises at least one selected from the group consisting of shutter speed, exposure mode, ISO, diaphragm stop, aperture value, photographing scene, and strobe ON/OFF.

7. An image processing apparatus, comprising:

moving-picture-data obtaining means for obtaining moving picture data generated by an input image device, said moving picture data comprising a plurality of blocks;

connection means for connecting to a first image output device which is configured to reproduce images from said moving picture data;

image-processing-control-information obtaining means for obtaining image processing control information associated with each block of the moving picture data, the image processing control information defining image processing conditions and being determined by both (i) characteristics of the image input device when said moving picture data was generated, and (ii) image output characteristics of a second image output device which was predetermined to reproduce images from said moving picture data, the image output characteristics of the second image output device are different from image output characteristics of the first image output device;

adjusting-information obtaining means for obtaining adjusting information for adjusting the image processing control information in accordance with the image output characteristics of the first image output device;

adjusting means for adjusting the obtained image processing control information by using the obtained adjusting information;

image processing means for performing image processing on each block of the moving picture data by using the adjusted image processing control information; and outputting means for outputting, through the connection means, the moving picture data that has been subjected to the image processing to the first image output device;

wherein the image processing control information includes more than one selected from the group consisting of noise suppression, sharpness, brightness, R, G, B color balance, contrast, and memory colors; and wherein said blocks comprise:

a first block consisting of the moving-picture-data of a plurality of frame images, and a second block consisting of the image-processing-control-information associated with said moving-picture-data of said frame images, wherein said second block precedes the first block.

8. The image processing apparatus according to claim 7, further comprising:

receiving means for receiving digital broadcasting waves from a broadcasting station to generate broadcasting data; and program-table-data obtaining means for obtaining program table data from the broadcasting data, wherein the moving-picture-data obtaining means is arranged for obtaining the moving picture data in said blocks from the broadcasting data, and the image-processing-control-information obtaining means is arranged for obtaining the image processing control information based on the program table data.

9. The image processing apparatus according to claim 7, said frame images corresponding to one scene.

10. The image processing apparatus according to claim 7, wherein the moving-picture-data obtaining means is arranged for obtaining the moving picture data after the image-processing-control-information associated with the moving-picture-data is obtained by the image-processing-control-information means.

11. The image processing apparatus according to claim 7, wherein each of said blocks includes both the moving-picture-data and the image-processing-control-information associated with said moving-picture-data with the image-processing-control-information preceding the associated moving-picture-data.

12. The image processing apparatus according to claim 7, wherein the image-processing-control-information obtaining means is further configured for obtaining, in addition to the image processing control information, photographing information concerning photographing conditions which were set by the image input device when said moving picture data was generated; and the image processing means is further configured for performing the image processing on each block of the moving picture data by using the adjusted image processing control information and the photographing information;

wherein said photographing information comprises at least one selected from the group consisting of shutter speed, exposure mode, ISO, diaphragm stop, aperture value, photographing scene, and strobe ON/OFF.

* * * * *